Oct. 26, 1965
H. S. JONSSON ETAL
3,214,119
MOVABLE CARRIAGE AND MOUNT
Filed Jan. 13, 1964
2 Sheets-Sheet 2
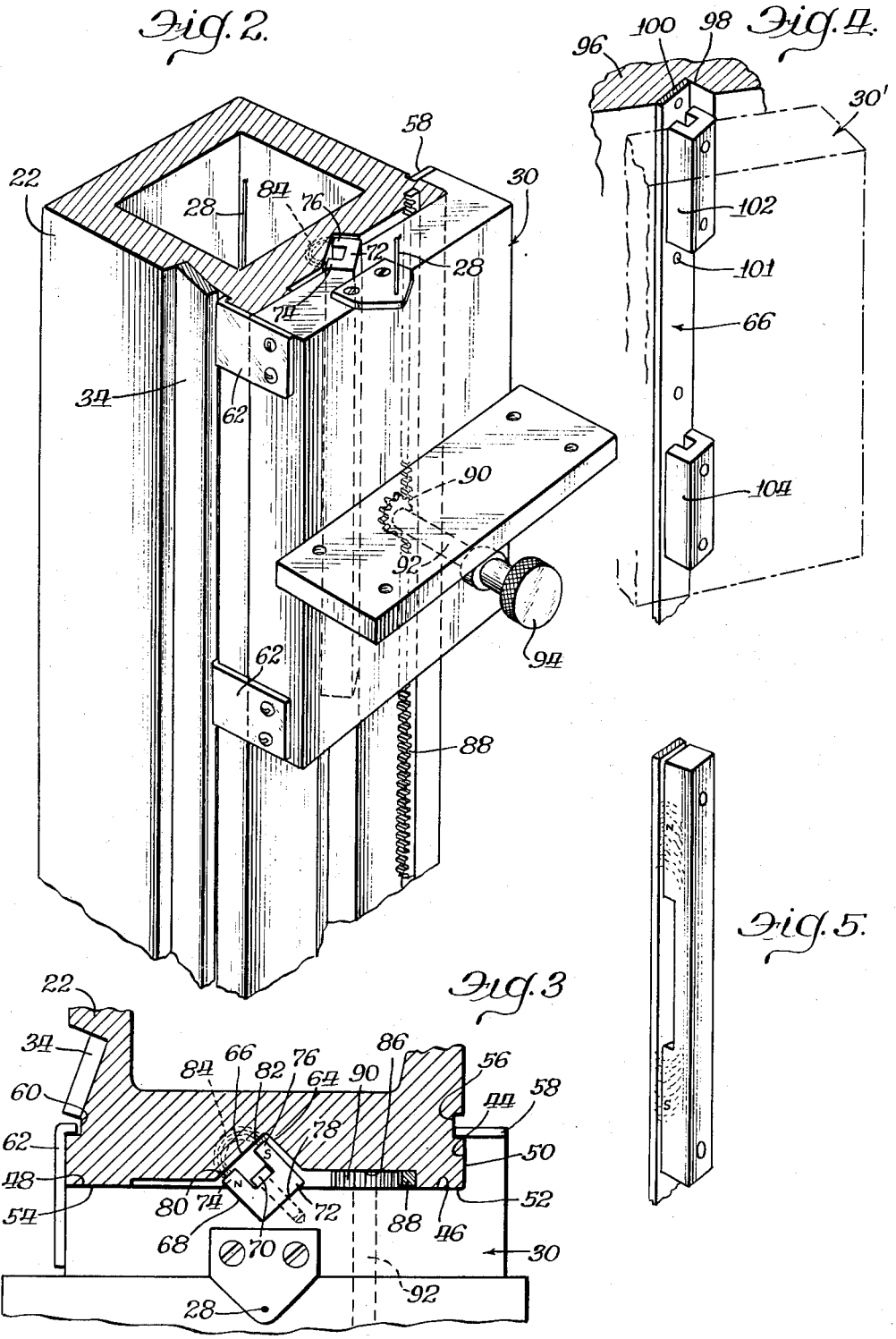

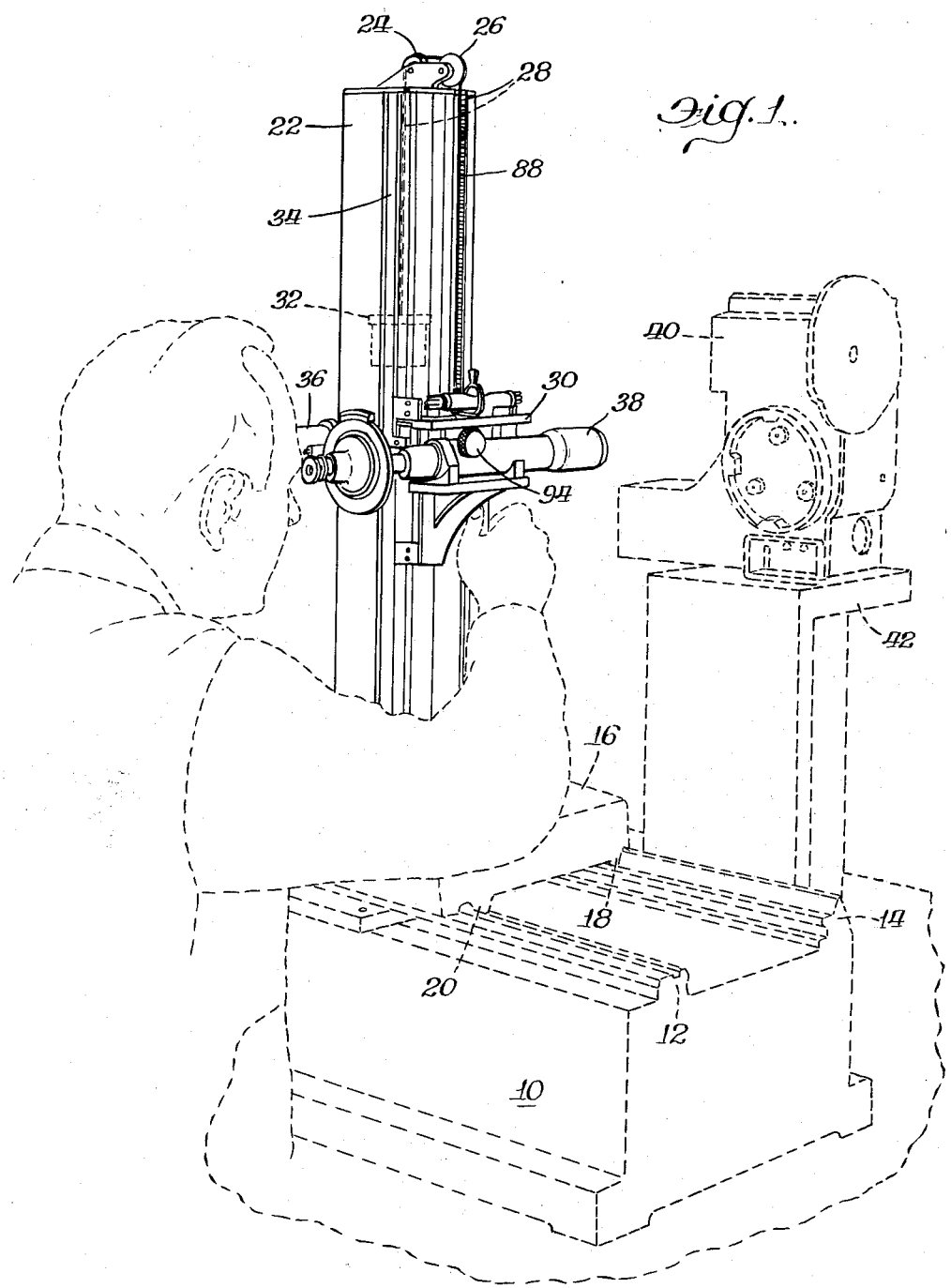

United States Patent Office 3,214,119
Patented Oct. 26, 1965

3,214,119
MOVABLE CARRIAGE AND MOUNT
Helge S. Jonsson, deceased, late of Park Ridge, Ill., by Esther E. Jonsson, Park Ridge, and Arthur D. Jonsson, Villa Park, Ill., sole heirs, assignors to The Gaertner Scientific Corporation, a corporation of Illinois
Filed Jan. 13, 1964, Ser. No. 337,992
13 Claims. (Cl. 248—123)

This invention relates to a movable carriage and mount, and to scientific instruments employing such a carriage and mount. More specifically, it relates to a base having guideways which are engaged by slides mounted on a carriage, said guideways and slides being held in engagement by a magnetic circuit through a portion of the base and a portion of the carriage. The invention is shown as part of a cathetometer, but is useful in all guideway-slide relations where accuracy of position and ease of adjustment are important.

Applicant's assignee manufactures cathetometers wherein an instrument mount or carriage is movable vertically on the side of a column or base. The carriage has slides which engage flat surfaces of guideways on the column or base, and it is the flush engagement of these guideways and slides alone which provides the desired accurate relationship. This flush engagement has been maintained in present instruments by spring members frictionally engaging a guideway or slide or even separate guideways. The resistance to relative movement of the carriage is not limited to the surfaces of the guideways and slides necessary for alignment but includes frictional engagement between additional members, i.e., springs, and hence the carriage becomes difficult to move with respect to the base. Moreover, where leaf springs are used, reversing the direction of movement of the carriage, causes rotational torque and inaccuracy. A feature of this invention is that the means for holding the carriage to the column does not increase the resistance to their relative movement.

The major object of this invention is to provide a means for holding the slides on the carriage to the guideways on the column or base with a force such that the mount or carriage may be readily moved with respect to the column and yet be held firmly in any given position with respect to the column.

More specifically, the object is to hold slides on a carriage to a guideway on a base sufficiently tightly so that the friction between the surfaces of the guideways and the base is sufficient to support the carriage at any given position on the column—without introducing additional friction factors. A feature of the invention is the provision of a magnetic or locking way on the base in spaced relation to a permanent magnet on the carriage. There is a film of air between the magnet and the locking way so that the holding power of the magnet does not increase the friction between the carriage and the base during relative movements.

Another object of this invention is to obtain a maximum utilization of the flux from a magnet of selected coercive force. A feature of the invention is the provision of a channel bar magnetized so that the two arms are of opposite polarity. The channel bar is on the carriage and its two arms are positioned adjacent a flux magnetic locking way on the base. The flux moves in magnetic material of high flux permeability, excepting for the two small air gaps. By this construction, flux leakage is minimized.

A third object of this invention is to utilize the combination of the transversely elongated magnet and the slide flux-conductive locking way surface for instruments made principally of materials which have very low flux conductivity such as aluminum. A feature of this embodiment of the invention is the positioning of a metallic strip of very high flux conductivity on a surface of a column made of aluminum and properly spaced from a magnet mounted on an aluminum carriage. In this construction, the surfaces of the guideway and the slides on the carriage are hardened by the Sanford Hard Coat method. Since the two flux conductors, namely the magnet and the permeable strip, are encased in aluminum, substantially all of the flux is utilized to hold the slide pads in tight engagement with the guide surfaces.

A further object of this invention is to relate the plane of the locking way along which the magnet operates to the planes of the slide and guideways so that the magnetic attraction will produce two force vectors which operate at right angles to each other.

A still further object of this invention is to position the magnetic mount and carriage at the center of gravity of the instrument. This reduces the likelihood of wear and maladjustment between the slide and the base.

The invention is described in connection with drawings, wherein:

FIGURE 1 is a perspective view of a cathetometer in use;

FIGURE 2 is a perspective view of a portion of the column and of the carriage without instruments shown in FIGURE 1;

FIGURE 3 is a plan view of the column and carriage of FIGURE 2;

FIGURE 4 is a second and third embodiment of the invention, the second being a magnetic way and carriage mounted on an instrument made of non-magnetic material such as aluminum, and the third embodiment employing two magnets in place of one; and, FIGURE 5 is a perspective view of a magnetic way and carriage wherein the flux threads the way longitudinally instead of transversely.

This invention will be described as incorporated in a cathetometer. Referring to the drawings, FIGURE 1, 10 is a bed having guideways 12 and 14 upon which may be reciprocated a base 16 having slides 18 and 20 complementary to guideways 12 and 14.

Mounted on the base 16 is a column 22 which is hollow, see FIGURE 2. Returning to FIGURE 1, disposed on top of the column 22 are a pair of sheaves 24 and 26 over which is entrained a cable 28, the outer end of which is fastened to a carriage 30, and the inner end to a counterbalancing weight 32 within the column.

Mounted on one wall of the column 22 is a scale 34 which may be read by a microscope 36, see FIGURE 1. Mounted on the carriage 30 is a microscope 38 for locating an object 40 which is mounted on a platform 42 in fixed relationship to the bed 10. The foregoing is the standard construction.

Referring now to FIGURE 3, the column has three guideways 44, 46 and 48. These are plane surfaces—two, 46 and 48 being in the same plane. The guideway 44 lies in a plane at right angles to the plane of guideways 46 and 48. The carriage has what we shall term slides 50, 52 and 54. The column has a vertical slot 56 in which rides a safety hanger 58, mounted on the carriage 30. It also has slot 60 in which rides a safety hanger 62, mounted on the carriage 30. These hangers do not contact the column 22 but merely restrict the carriage from losing contact with the principal guides 44, 46 and 48, in the event of accidental subjection to an external force.

A vertical trough or groove 64 is disposed approximately midway between the surfaces 48 and 46. This trough is at approximately the vertical center of gravity of the system. This trough has a surface 66 lying in a plane at a 45° angle to the plane of the guideways 46 and 48, and also to the guideway 44. This surface 66 is called the magnetic or locking way. Mounted by bolts such as 70 in a similar slot 68 on the carriage 30 is a channel bar 72 which has been magnetized so that the arms 74 and 76 are of opposite polarity. By means of accurate finishing, or by the use of shims at 78, the pole faces 80 and 82 are spaced by a film of air from the surface or magnetic way 66. The spacing may be $1/1000$ of an inch. The important thing is that the magnetic circuit be as suggested by the dotted lines 84 in FIGURE 3. The air gap adjacent the pole faces 80 and 82 is so small that substantially all of the flux from the permanent magnet 72 is confined in the circuit 84 as shown. Hence the maximum effort is exerted by the flux between the guideway 44 and the associated slide 50; the guideway 46 and the associated slide 52; and the guideway 48 and the associated slide 54.

Mounted in a recess 86 of the column 22 is a rack 88 which is engaged by a pinion 90 mounted on a shaft 92 journaled in the carriage 30 and carrying at its outer end a knurled finger knob 94.

As indicated above, this construction eliminates springs between the guideway and the slide. The ability of the magnet to hold the carriage slides to the column's guideways is constant and the extent can be controlled by the spacing of the faces 80 and 82 from the magnetic way 66. The carriage holds whatever position is provided by the hand working the finger knob 94. This is shown as a single direct-acting shaft, but a vernier may be provided.

The foregoing is the basic idea as originally conceived by applicant as applied on an instrument made of magnetic material. In FIGURES 4 and 5, applicant shows a movable carriage and mount disposed in a nonmagnetic instrument. Applicant's assignee finds an increasing demand for lighter instruments. The structure shown in FIGURE 1 when made of ferrous materials, weighs several pounds. Steel was essential so long as lighter materials did not provide durable guideways and slides. However, recent hardening techniques for aluminum have developed surfaces which resist diamond cutting to a degree at least equal to the best hardened steel surface, with the result that applicant's assignee is designing equipment in which the column 22 of FIGURE 1 and FIGURE 2 is made of aluminum as are the bed 10 and the work bracket 42.

In applying the invention to these aluminum structures, the movable carriage and mount is shown in its simplest form. Referring to FIGURE 4, the portion of the column 96 is made of aluminum. A recess 98 is provided and in this sits a magnetic strip 100 of high flux permeability. It is held to the aluminum column by screws such as 101 and extends the full vertical length of the column. The strip should have a flux-carrying capacity equal to the total coersive force of the magnet 72. Its thickness will depend upon the permeability of the material used. The carriage 30' will be identical to that of FIGURES 1 and 2, and may have the same long permanent magnet 72. However, since the carriage is lighter, applicant uses two separate magnets 102 and 104.

In FIGURE 5, the combination of the magnetic strip and bar magnet magnetized as indicated by the letters N and S is used. Other instruments may be devised, but the basic principle is to hold the carriage to the column through the frictional areas between the guideways and the slides. Referring to FIGURE 3, the guideway 48 and the slide 54 are in theory not necessary. Theoretically, the guideways 44 and 46 engaged by slides 40 and 52 should be enough. It is, nevertheless, better to have the guideway 48 and slide 54 to reduce chance of rotation by the carriage with respect to the column. Moreover, the magnetic way 66 and magnet 72 are substantially in the center of gravity of the column and support with the result that the tendency for the carriage to rotate on the column is minimized. The foregoing illustrates that what is important is anchoring the carriage over the vertical corner provided by the guideways 44 and 46. There must be a pull to the left and a pull upwardly as viewed in FIGURE 3.

The foregoing has been discussed in connection with a carriage mounted on a vertical column. The principle operates equally well where the guideways are at an angle with the vertical or horizontal.

Applicant's embodiments show the magnet mounted on the carriage and the magnetic way on the column. The relationship could be reversed.

Having thus described the invention, what applicant claims is:

1. A movable carriage and mount comprising a base, a carriage disposed adjacent the base, a guideway and a slide, one on the carriage and one on the base, said guideway and slide frictionally engaging each other, and means for holding the slide in fixed relation to the guideway without adding friction-engaging areas to those provided by the guideway on the base and the slide on the carriage.

2. The movable carriage and mount of claim 1 wherein the holding means comprises a magnetic way parallel to the guideway and a magnet, one on the base and one on the carriage, with an air gap between the magnet and the magnetic way.

3. The movable carriage and mount of claim 2 wherein the guideway and magnetic way are vertically disposed and the magnetic way is positioned near the vertical center of gravity of the assembly.

4. A movable carriage and mount comprising a base, two parallel guideways each having a flat surface lying in a plane normal to the other mounted on said base, a magnetic way parallel to the guideways and having a flat surface lying in a plane at a 45° angle to the surfaces of said guideways, said magnetic way being composed of flux-conductive material, a carriage, a slide frictionally engageable with each guideway mounted on the carriage, and a permanent magnet mounted on the carriage and positioned immediately adjacent the magnetic way on the base.

5. The movable carriage and mount of claim 4 wherein the base is an upright column, rectangular in cross section, the two guideways are at intersecting sides of one corner of the section of the column, and the magnetic way is recessed in one of said sides of the column.

6. The movable carriage and mount of claim 4 wherein the permanent magnet is a channel having each arm of opposite polarity with the outside surface of the two arms in spaced flux-conductive relationship with the flux-permeable material of the magnetic way of the base.

7. The movable carriage and mount of claim 4 wherein the permanent magnet comprises two U-shaped channels positioned at opposite ends of the carriage with the outside surfaces of the two arms of opposite polarity and in spaced, flux-conductive relationship with the flux-permeable material of the magnetic way of the base.

8. The movable carriage and mount of claim 4 wherein the poles of the magnet are flat and are spaced from the magnetic way by a distance just sufficient to avoid frictional engagement between said poles and the magnetic way.

9. The movable carriage and mount of claim 4 in the combination with a rack and pinion assembly, the rack and the pinion being mounted, one on the base and the other on the support.

10. A movable carriage and mount comprising a hollow, vertical column, two parallel guideways each having a flat surface lying in a plane normal to the other mounted adjacent one vertical corner of said column, a magnetic way parallel to said guideways and having a flat surface lying in a plane at a 45° angle to the surfaces of said guideways and mounted on said column, said magnetic way being composed of flux-conductive material, a support, a freely rotatable pulley mounted on the top of said column, a counterweight vertically movably supported within said column, a cable connecting the support and the counterweight over said pulley, a slide frictionally engageable with each guideway mounted on the support, and a permanent magnet mounted on the support and positioned immediately adjacent the locking guideway on the column.

11. The movable carriage and mount of claim 4 together with auxiliary clamps for holding the support to the base.

12. In combination with a base having guideways and a support having slides engageable with said guideways and reciprocable therealong, a flux-permeable magnetic way parallel to the guideways and a permanent magnet spaced by a small air gap from the locking way, said magnetic way and said magnet being mounted one on the base and the other on the support whereby the slides irrespective of the attitude toward gravity are held in such engagement with each other that only an added force will move them with respect to each other.

13. The movable carriage and mount of claim 4 wherein the permanent magnet is a bar magnet with opposite poles at the two ends and which are placed adjacent the magnetic way on the base.

References Cited by the Examiner

UNITED STATES PATENTS

| | | | |
|---|---|---|---|
| 2,568,575 | 9/51 | Wickman | 33—76 |
| 2,575,097 | 11/51 | Cole | 248—125 |
| 2,673,626 | 3/54 | Bastin | 188—165 |

FOREIGN PATENTS 327,319  1858  Switzerland.

CHANCELLOR E. HARRIS, *Primary Examiner.*

CLAUDE A. LE ROY, *Examiner.*